United States Patent
Lee

(10) Patent No.: US 8,240,214 B2
(45) Date of Patent: Aug. 14, 2012

(54) IMPACT TESTING DEVICE

(76) Inventor: Kun-Ta Lee, Taipei Hsien (TW)

(*) Notice: Subject to any disclaimer, the term of this patent is extended or adjusted under 35 U.S.C. 154(b) by 0 days.

(21) Appl. No.: 12/580,492

(22) Filed: Oct. 16, 2009

(65) Prior Publication Data

US 2010/0294019 A1 Nov. 25, 2010

(30) Foreign Application Priority Data

May 25, 2009 (TW) ................................ 98209108 U

(51) Int. Cl.
*G01N 29/00* (2006.01)
*G01N 3/32* (2006.01)
(52) U.S. Cl. .................... 73/663; 73/665; 73/12.09
(58) Field of Classification Search ........... 73/633, 73/635, 12.09
See application file for complete search history.

(56) References Cited

U.S. PATENT DOCUMENTS

| | | | | |
|---|---|---|---|---|
| 5,365,788 | A | * | 11/1994 | Hobbs ............................ 73/665 |
| 5,412,991 | A | * | 5/1995 | Hobbs ............................ 73/663 |
| 5,517,857 | A | * | 5/1996 | Hobbs ............................ 73/663 |
| 5,589,637 | A | * | 12/1996 | Hobbs ............................ 73/663 |
| 5,612,495 | A | * | 3/1997 | Shimada et al. ................ 73/628 |
| 5,744,724 | A | | 4/1998 | Hobbs |
| 5,836,202 | A | * | 11/1998 | Hobbs ............................ 73/663 |
| 5,969,256 | A | * | 10/1999 | Hobbs ............................ 73/663 |
| 6,220,100 | B1 | | 4/2001 | Felkins et al. |
| 6,766,695 | B2 | * | 7/2004 | Hwang ........................... 73/663 |

FOREIGN PATENT DOCUMENTS

| | | |
|---|---|---|
| CN | 201130083 | 10/2008 |
| WO | 03/042664 A1 | 5/2003 |
| WO | WO 03/042664 | 5/2003 |

OTHER PUBLICATIONS

International Search Report dated Mar. 18, 2009.
English language translation of abstract of CN 201130083 (published Oct. 8, 2008).
Great Britain Examination Report mailed Jun. 13, 2012.

* cited by examiner

*Primary Examiner* — Lisa Caputo
*Assistant Examiner* — Jonathan Dunlap
(74) *Attorney, Agent, or Firm* — Thomas, Kayden, Horstemeyer & Risley, LLP

(57) ABSTRACT

An impact testing device is provided. The impact testing device comprises a plate and an impact generating module. The plate has a first surface for loading a test object. The impact generating module is fastened to the plate to apply an impact to the plate and actuate the plate along the first direction, the second direction and the third direction independently. Thereby, the impact testing device of this invention is adapted to apply the impact to the test object along any direction under control.

9 Claims, 5 Drawing Sheets

IMPACT TESTING DEVICE

This application claims priority to Taiwan Utility Model Patent Application No. 098209108 filed on May 25, 2009, the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a testing device, and more particularly, the present invention relates to an impact testing device.

2. Descriptions of the Related Art

In various industries, the durability of a product determines whether the product may be damaged by impact during general use or transportation. Whether products are durable or liable to failure further determines the confidence of users to assess the product quality of individual companies. Therefore, for these industries, durability tests are often tests that products must pass before mass production. As shown in FIG. 1, a conventional impact testing device 1 is formed by a plate 11 and a plurality of conventional air hammers 12 in combination. A test object is fastened to the first surface 111 of the plate 11, while the air hammers 12 are fastened to a second surface 112 of the plate 11 at various angles. When pressurized air is inputted into the air hammers 12, the air hammers 12 will generate impact force of variable strength and frequency that is applied to the test object repeatedly. From the test results, the durability of the test object against impact can be inferred.

More specifically, when pressurized air is filled into an air hammer 12, a piston of the air hammer 12 will be driven by the pressurized air to apply an impact force on the test object. Through the design of air flow passages, the piston of the air hammer 12 will move to such an extent that a second air inlet in the air hammer 12 is opened, so that the pressurized air inputted from the second air inlet is adapted to push the air hammer 12 back to the original position for preparation of the next impact. However, the length, pipe diameter and bending portions of the internal air passages of the air hammer 12 all may lead to the variation of the air pressures and flow rates, resulting in the failure to apply an impact force of the same magnitude and phase in the next impact. Because of the slight variations in magnitude and frequency of the impact forces generated at different times by the air hammer 12, it is impossible to get a coordinated actuation effect when a plurality of air hammers 12 are operating at the same time, and consequently, it is impossible to generate a resultant impact force of a certain magnitude and phase by using the plurality of air hammers 12 in combination.

In the conventional impact testing device 1, the plurality of conventional air hammers 12 generate impact on the plate 11 disorderly at various angles at the same time. Therefore, it is difficult to accurately control the magnitude and direction of the resultant impact force generated by the air hammers 12 and it is impossible for the air hammers 12 to operate in a coordinated manner, which makes it hard for the impact testing device 1 to perform an impact durability test with an impact force of a specific magnitude and phase in a specific direction. Hence, the conventional impact testing device 1 fails to satisfy the requirements of product manufacturers in which accurate impact durability tests performed on the products with an impact force of a specific magnitude and phase in a specific direction.

In view of this, it is important to provide an impact testing device that can be controlled to generate an impact force of a specific magnitude and phase in a specific direction.

SUMMARY OF THE INVENTION

The primary objective of the present invention is to provide an impact testing device that can be controlled to generate an impact force of a specific magnitude and phase in a specific direction.

The impact testing device disclosed in the present invention comprises a plate and an impact generating module. A test object is fastened to a first surface of the plate, and the impact generating module is fastened to the plate. The impact generating module is adapted to apply the impact to and actuate the plate. The impact generating module comprises a plurality of impact generating devices disposed along a first direction, a second direction and a third direction respectively for actuating the plate along the first direction, second direction and third direction independently. With this arrangement, the impact generating module can be controlled to repeatedly apply an impact force of a specific magnitude in a specific direction to the test object on the plate, thereby performing the impact durability test.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
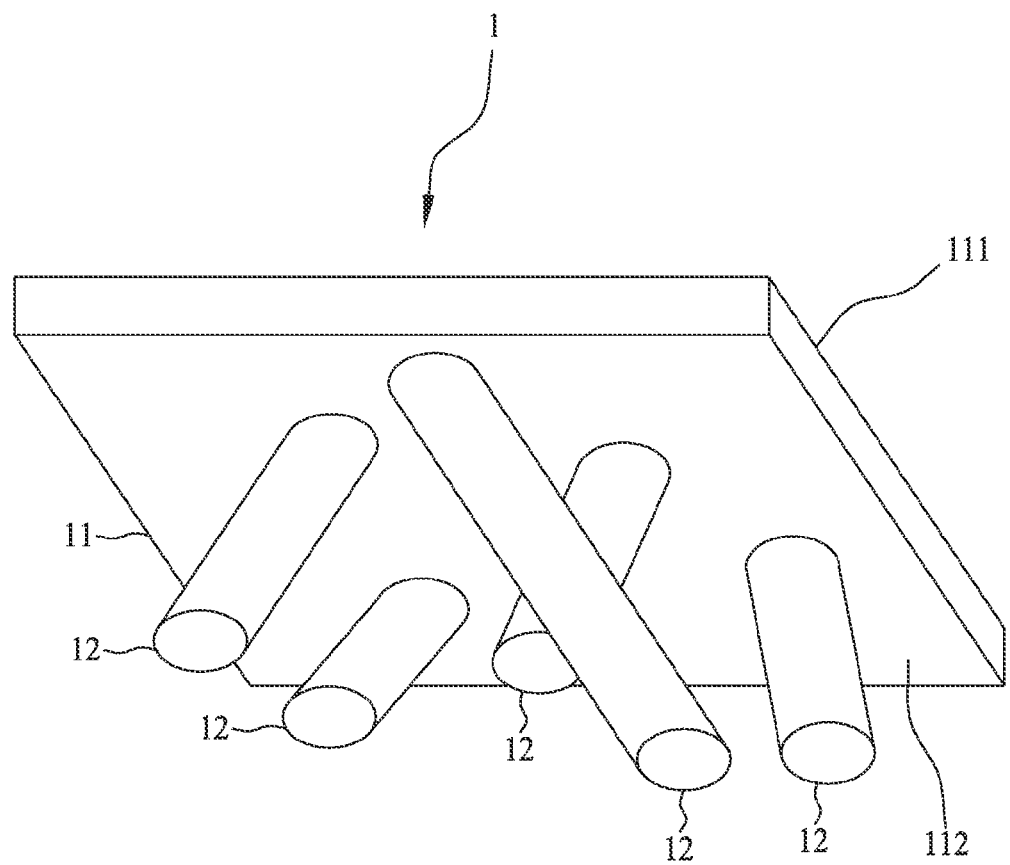
FIG. 1 is a schematic view of a conventional impact testing device.
Figure 2:
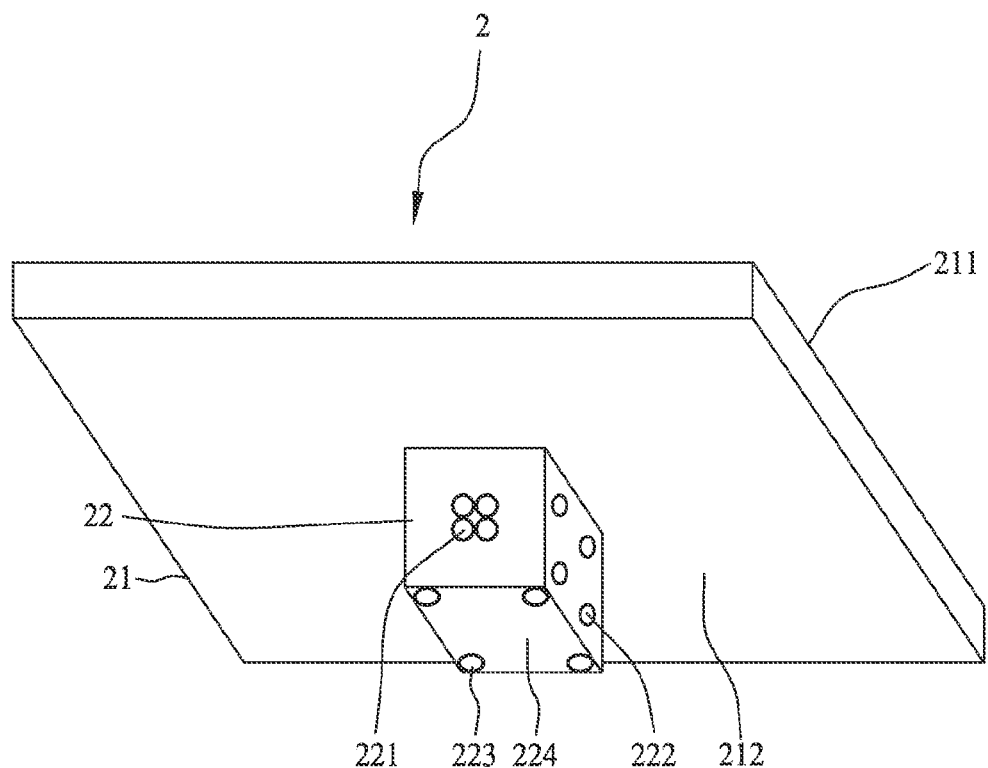
FIG. 2 is a schematic view of an impact testing device according to the first embodiment of the present invention.
Figure 3:
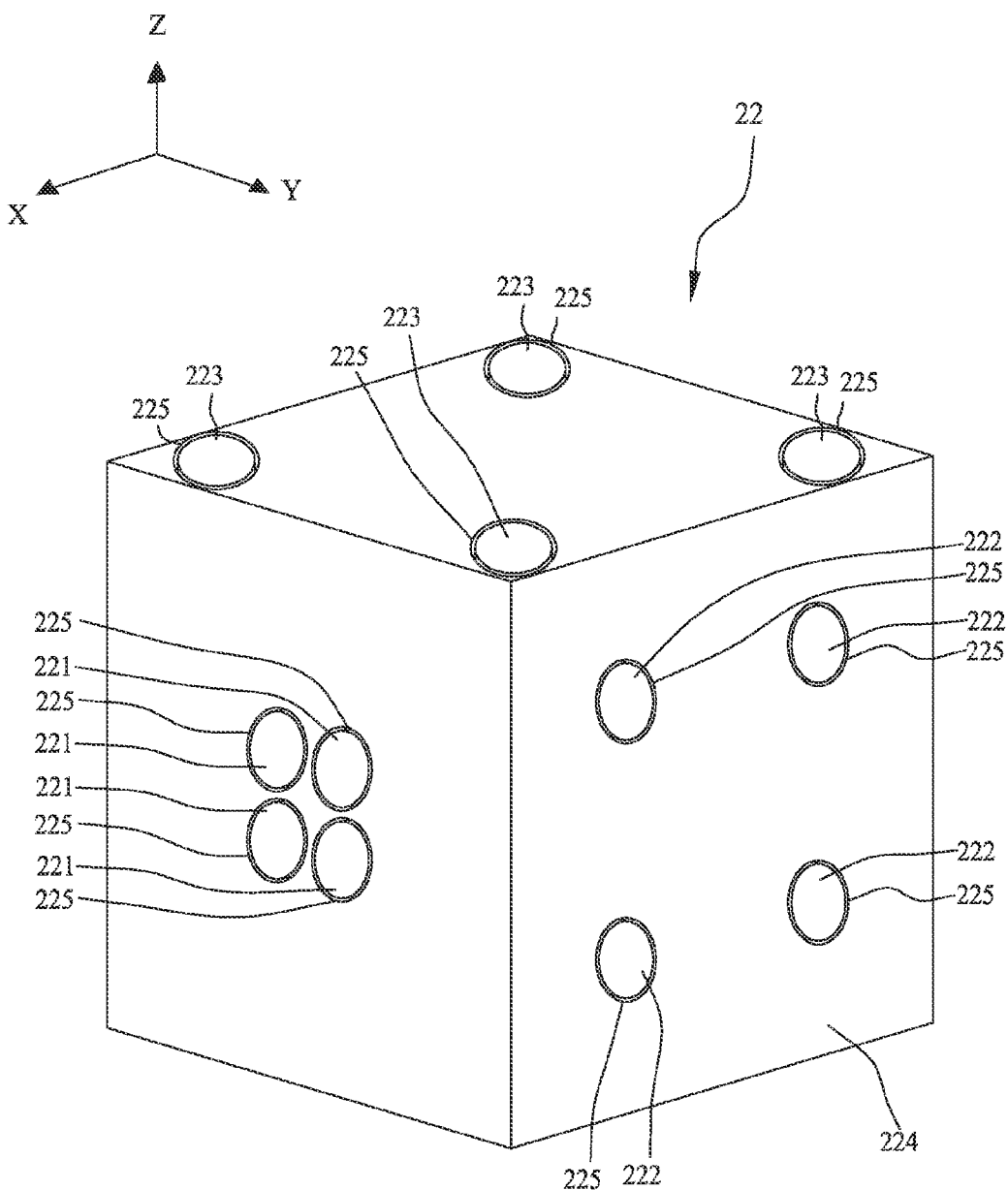
FIG. 3 is a schematic view of an impact generating module of the present invention.

As shown in FIGS. 2 and 3, an impact testing device 2 according to the first embodiment of the present invention comprises a plate 21 and an impact generating module 22. The plate 21 has a first surface 211 and a second surface 212 opposite to the first surface 211. A test object is fastened to the first surface 211 of the plate 21, and the impact generating module 22 is fastened to the second surface 212 of the plate 21. The impact generating module 22 is adapted to apply an impact force to the plate 21 to actuate the plate 21 along a first direction X, second direction Y and third direction Z independently. With this arrangement, the impact testing device 2 of the present invention can be controlled to apply an impact force to the test object along any direction. The impact applied to the plate 21 is adapted to actuate the plate 21 in reciprocating vibration, thereby proceeding the impact durability test.

In more detail, the impact generating module 22 comprises a first impact generating device 221 disposed along the first direction X, a second impact generating device 222 disposed along the second direction Y and a third impact generating device 223 disposed along the third direction Z. The first impact generating device 221, the second impact generating device 222 and the third impact generating device 223 are adapted to generate impact along the first direction X, the second direction Y and the third direction Z independently to actuate the plate 21. The impact generating module 22 comprises a body 224 with a plurality of holes 225 adapted to receive the first impact generating device 221, the second impact generating device 222 and the third impact generating device 223 correspondingly. In this embodiment, the first direction X, the second direction Y and the third direction Z are preferably perpendicular to each other.

As shown in FIG. 3, the impact generating module 22 in this embodiment comprise four first impact generating devices 221 disposed along the first direction X, four second impact generating devices 222 disposed along the second direction Y and four third impact generating devices 223 disposed along the third direction Z, all of which are staggered with each other. The four third impact generating devices 223 are disposed in a plane of the impact generating module 22 that is perpendicular to the third impact generating devices 223, and are arranged at four corners in a 2 by 2 matrix. The four second impact generating devices 222 are disposed in another plane of the impact generating module 22 that is perpendicular to the second impact generating devices 222, and are arranged at a central area in a 2 by 2 matrix. The four first impact generating devices 221 are disposed in a further plane of the impact generating module 22 that is perpendicular to the first impact generating devices 221, and are arranged in a 2 by 2 matrix. Furthermore, the first impact generating devices 221 are staggerd with the second impact generating devices 222 and the third impact generating devices 223. The body 224 of the impact generating module 22 is formed with corresponding holes 225 to receive the four first impact generating devices 221, the four second impact generating devices 222 and the four third impact generating devices 223 respectively.

The first impact generating devices 221, the second impact generating devices 222 and the third impact generating devices 223 of the present invention are preferably a plurality of electric hammers which produce impacting motions by virtue of the electromagnetic induction principle to generate the impact force.

Figure 4A:
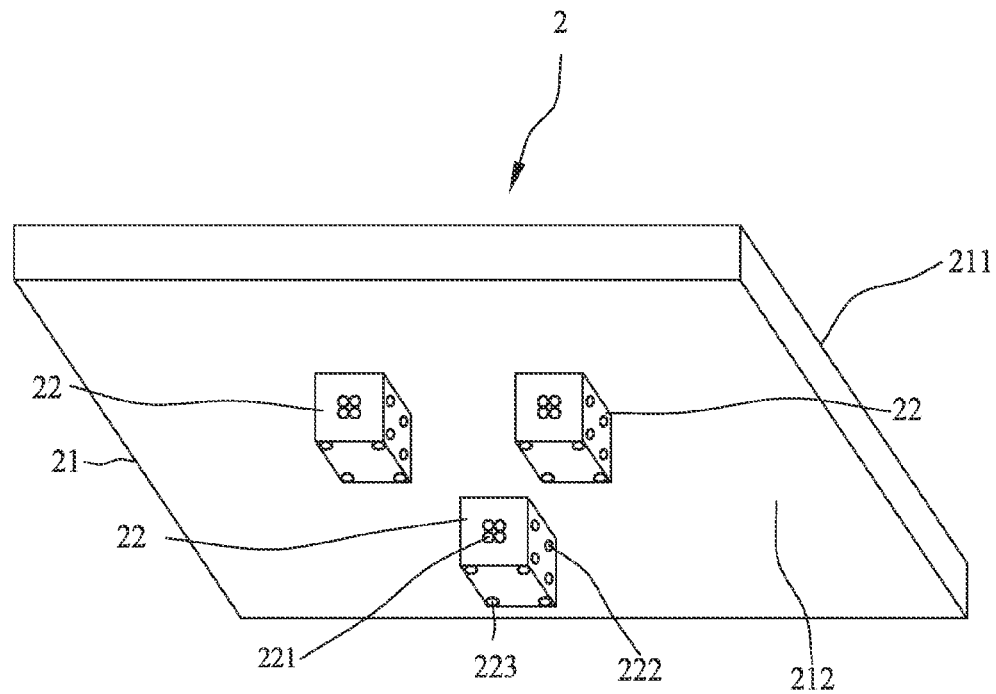
FIG. 4A is a schematic view of an impact testing device according to the second embodiment of the present invention.
Figure 4B:
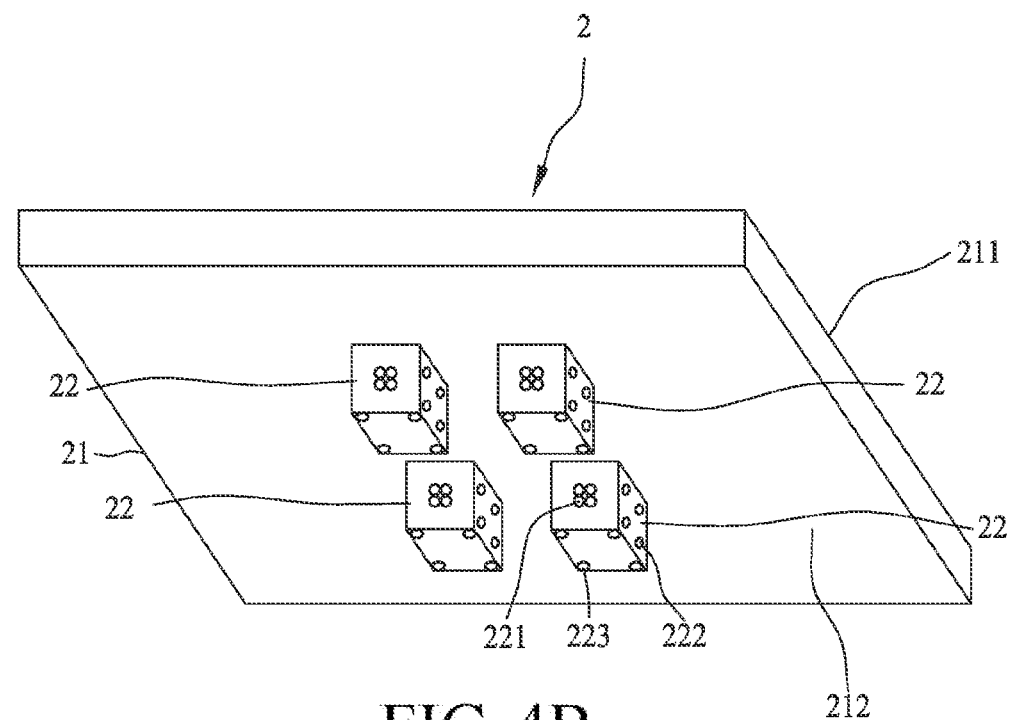
FIG. 4B is a schematic view of an impact testing device according to the third embodiment of the present invention.
Figure 4C:
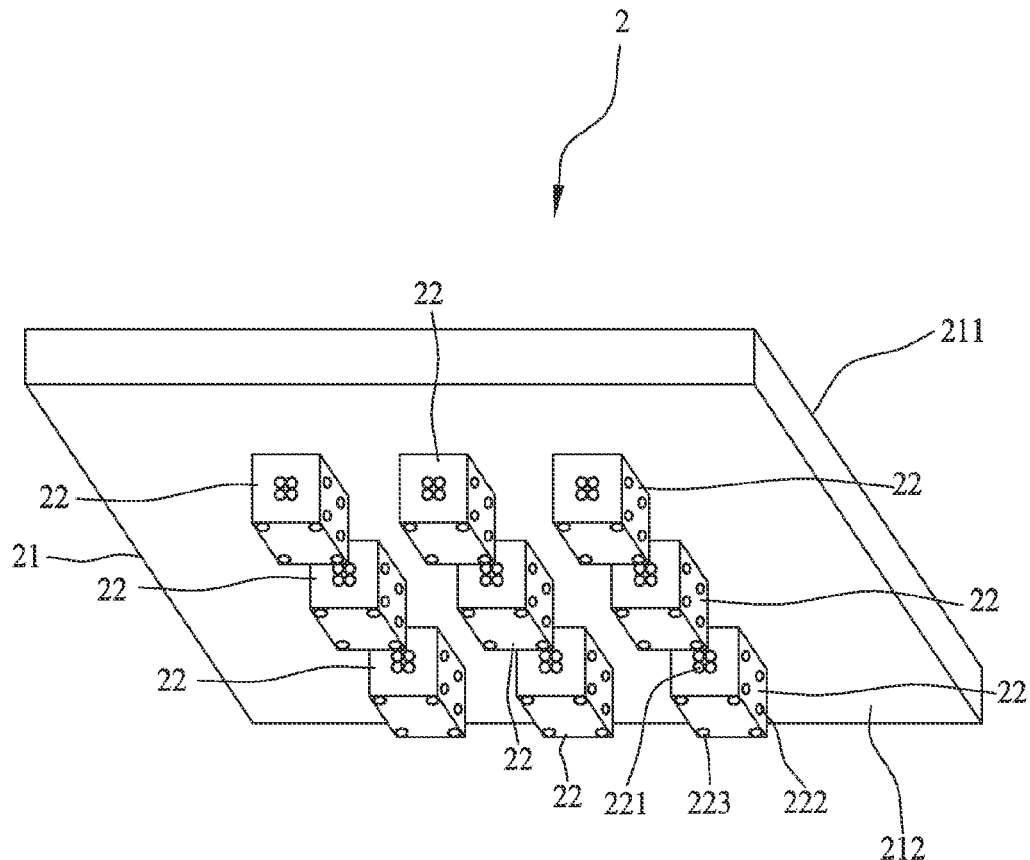
FIG. 4C is a schematic view of an impact testing device according to the fourth embodiment of the present invention.

FIGS. 4A, 4B and 4C illustrate the second, the third and the fourth embodiment of the present invention. As shown in FIG. 4A, the impact testing device 2 of the second embodiment comprises three impact generating modules 22. All the three impact generating modules 22 are fastened to the second surface 212 of the plate 21, while the test object is fastened to the first surface 211. The three impact generating modules 22 apply impact to the plate 21 to actuate the plate 21 in reciprocating vibration. As the impact generating modules 22 are adapted to generate impact forces along the first direction X, the second direction Y and the third direction Z independently, rotational impact forces along the first direction X, the second direction Y and the third direction Z independently can be further generated jointly by the three impact generating modules 22 through controlling the impacting forces that they generated, thereby accomplishing generating impact forces along any direction in the six degrees of freedom. Other detailed structures of the impact testing device 2 of the second embodiment are similar to those of the first embodiment and, thus, will not be further described herein.

FIG. 4B shows the impact testing device 2 of the third embodiment, which comprises four impact generating modules 22. In the third embodiment, the four impact generating modules 22 are arranged uniformly in a 2 by 2 matrix and fastened to the second surface 212 of the plate 21. The test object is still fastened to the first surface 211. Likewise, the four impact generating modules 22 apply impact to the plate 21 to actuate the plate in reciprocating vibration. Through control, the four impact generating modules 22 can jointly generate, in a more even and secure manner, linear impact along the first direction X, the second direction Y and the third direction Z independently or rotational impact along the first direction X, the second direction Y and the third direction Z independently, thereby generating impact forces along any direction in the six degrees of freedom. Other detailed structures of the impact testing device 2 of the third embodiment are similar to those of the first embodiment and, thus, will not be further described herein.

As shown in FIG. 4C, the impact testing device 2 of the fourth preferred embodiment comprises nine impact generating modules 22. The nine impact generating modules 22 are arranged uniformly in a 3 by 3 matrix and fastened to the second surface 212 of the plate 21. Accordingly, as compared to the third embodiment, the nine impact generating modules 22 of the fourth embodiment can jointly generate, in a more even and secure manner, linear impact along the first direction X, the second direction Y and the third direction Z independently or rotational impact along the first direction X, the second direction Y and the third direction Z independently. Other detailed structures of the impact testing device 2 of the fourth embodiment are similar to those of the first embodiment and, thus, will not be further described herein.

The impact generating modules 22, the first impact generating devices 221, the second impact generating devices 222 and the third impact generating devices 223 described in the embodiments of the present invention are only intended to illustrate spirits and preferred implementations of the present invention. It will be readily appreciated by those of ordinary skill in the art that in the impact testing device 2 of the present invention, the impact generating modules 22, the first impact generating devices 221, the second impact generating devices 222 and the third impact generating devices 223 may also exist in other numbers or at other locations. Furthermore, the first impact generating devices 221, the second impact generating devices 222 and the third impact generating devices 223 may also be different types of impact generating devices, and even air hammers used in the prior art may also be applied in the present invention provided that magnitude and frequency of the impact force thereof can be controlled.

According to the above descriptions, by inputting the controlled current into the first impact generating devices 221, the second impact generating devices 222 and the third impact generating devices 223 to generate impact of a specific magnitude, phase and frequency respectively, linear or rotational impact forces can be jointly generated by the impact generating module 22 that can generate impact forces along the first direction X, the second direction Y and the third direction Z independently. Accordingly, the impact testing device 2 of the present invention is adapted to apply an impact force to the test object along any direction in the six degrees of freedom as controlled, thereby performing an accurate impact durability test.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An impact testing device for applying an impact to a test object, comprising:
 a plate having a first surface for loading the test object; and
 an impact generating module fastened under the plate, comprising:
  at least one first impact generating device, at least one second impact generating device and at least one third impact generating device; and
  a body having a plurality of internal holes which are disposed along a first direction, a second direction and a third direction inside the body for receiving the at least one first impact generating device, the at least one second impact generating device and the at least one third impact generating device, respectively;
 wherein the first direction, the second direction and the third direction are perpendicular to each others, and the impact generating module applies the impact to the plate and actuate the plate along the first direction, the second direction and the third direction independently.

2. The impact testing device as claimed in claim 1, wherein the plate has a second surface opposite to the first surface, and the impact generating module is fastened to the second surface.

3. The impact testing device as claimed in claim 1, wherein the impact testing device comprises a first impact generating device disposed along the first direction, a second impact generating device disposed along the second direction and a third impact generating device disposed along the third direction, and the first impact generating device, the second impact generating device and the third impact generating device are adapted to generate the impact along the first direction, the second direction and the third direction respectively.

4. The impact testing device as claimed in claim 3, wherein the impact generating module comprises four first impact generating devices, four second impact generating devices and four third impact generating devices.

5. The impact testing device as claimed in claim 3, wherein the first impact generating device, the second impact generating device and the third impact generating device are a plurality of electric hammers.

6. The impact testing device as claimed in claim 1, wherein the impact generated by the impact generating module is applied to the plate to actuate the plate in reciprocating vibration.

7. The impact testing device as claimed in claim 1, wherein the impact testing device comprises three impact generating modules fastened to the plate.

8. The impact testing device as claimed in claim 1, wherein the impact testing device comprises four impact generating modules fastened to the plate in a 2 by 2 matrix.

9. The impact testing device as claimed in claim 1, comprising nine impact generating modules fastened to the plate in a 3 by 3 matrix.

* * * * *